US 12,541,061 B2

(12) United States Patent
Eid et al.

(10) Patent No.: US 12,541,061 B2
(45) Date of Patent: Feb. 3, 2026

(54) DIAMOND SPOT SIZE CONVERTER FOR FIBER EDGE COUPLING

(71) Applicant: Avago Technologies International Sales Pte. Limited, Singapore (SG)

(72) Inventors: Nourhan Eid, San Jose, CA (US); Shiyun Lin, San Jose, CA (US); Naser Dalvand, San Jose, CA (US); Vivek Raghunathan, Mountain View, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 387 days.

(21) Appl. No.: 17/876,867

(22) Filed: Jul. 29, 2022

(65) Prior Publication Data
US 2024/0036263 A1 Feb. 1, 2024

(51) Int. Cl.
G02B 6/30 (2006.01)
G02B 6/122 (2006.01)
G02B 6/26 (2006.01)
G02B 6/12 (2006.01)

(52) U.S. Cl.
CPC .......... G02B 6/305 (2013.01); G02B 6/1228 (2013.01); G02B 6/26 (2013.01); G02B 6/12002 (2013.01)

(58) Field of Classification Search
CPC .... G02B 6/12002; G02B 6/1228; G02B 6/26; G02B 6/305
See application file for complete search history.

(56) References Cited

U.S. PATENT DOCUMENTS

| | | | |
|---|---|---|---|
| 9,829,629 B2 | 11/2017 | Horth et al. | |
| 10,197,731 B2 | 2/2019 | Teng et al. | |
| 10,197,734 B2 * | 2/2019 | Painchaud | G02B 6/125 |
| 10,444,434 B2 | 10/2019 | Qi et al. | |
| 10,534,136 B1 * | 1/2020 | Puckett | G02B 6/305 |
| 10,578,806 B2 | 3/2020 | Lamponi et al. | |
| 10,663,663 B2 | 5/2020 | Painchaud et al. | |
| 10,677,991 B2 | 6/2020 | Novack et al. | |
| 10,942,314 B2 | 3/2021 | Horth | |
| 11,215,755 B2 | 1/2022 | Liu et al. | |
| 11,215,756 B2 | 1/2022 | Bian et al. | |

(Continued)

FOREIGN PATENT DOCUMENTS

WO 2021209139 A1 10/2021

OTHER PUBLICATIONS

Sun S, et al., Novel Low-Loss Fiber-Chip Edge Coupler for Coupling Standard Single Mode Fibers to Silicon Photonic Wire Waveguides. Photonics. 2021; 8(3):79. https://doi.org/10.3390/photonics8030079.

(Continued)

*Primary Examiner* — Daniel Petkovsek
(74) *Attorney, Agent, or Firm* — Quarles & Brady LLP

(57) ABSTRACT

An optical coupler configured to couple light along a propagation direction is disclosed. The optical coupler includes a lower area. The lower area includes a waveguide including a first end, a second end, and an inversely tapered portion. The optical coupler includes an intermediary area arranged over, in a vertical direction, the lower area. The intermediary area includes two or more intermediary elements. The optical coupler includes an upper area arranged over the intermediary area. The upper area includes one or more upper elements.

20 Claims, 15 Drawing Sheets

(56) References Cited

U.S. PATENT DOCUMENTS

| | | | | |
|---|---|---|---|---|
| 11,320,589 | B1* | 5/2022 | Bian | G02B 6/124 |
| 11,567,261 | B2* | 1/2023 | Bian | G02B 6/1225 |
| 11,789,208 | B1* | 10/2023 | Bian | G02B 6/12002 |
| | | | | 385/43 |
| 11,947,168 | B2* | 4/2024 | Bian | G02B 6/1228 |
| 12,147,075 | B2* | 11/2024 | Bian | G02B 6/4214 |
| 2015/0010266 | A1 | 1/2015 | Webster et al. | |
| 2015/0293299 | A1* | 10/2015 | Xu | G02B 6/1228 |
| | | | | 385/28 |
| 2017/0293073 | A1* | 10/2017 | Chen | G02B 6/138 |
| 2018/0067259 | A1 | 3/2018 | Teng et al. | |
| 2019/0154919 | A1 | 5/2019 | Teng et al. | |
| 2019/0384003 | A1 | 12/2019 | Painchaud et al. | |
| 2020/0116930 | A1* | 4/2020 | Kannan | G02B 6/122 |
| 2022/0043207 | A1 | 2/2022 | Bian | |
| 2022/0326441 | A1* | 10/2022 | Sapra | G02B 6/124 |

OTHER PUBLICATIONS

Dec. 5, 2023, ExtendedSearchReport, 7 pages.

* cited by examiner

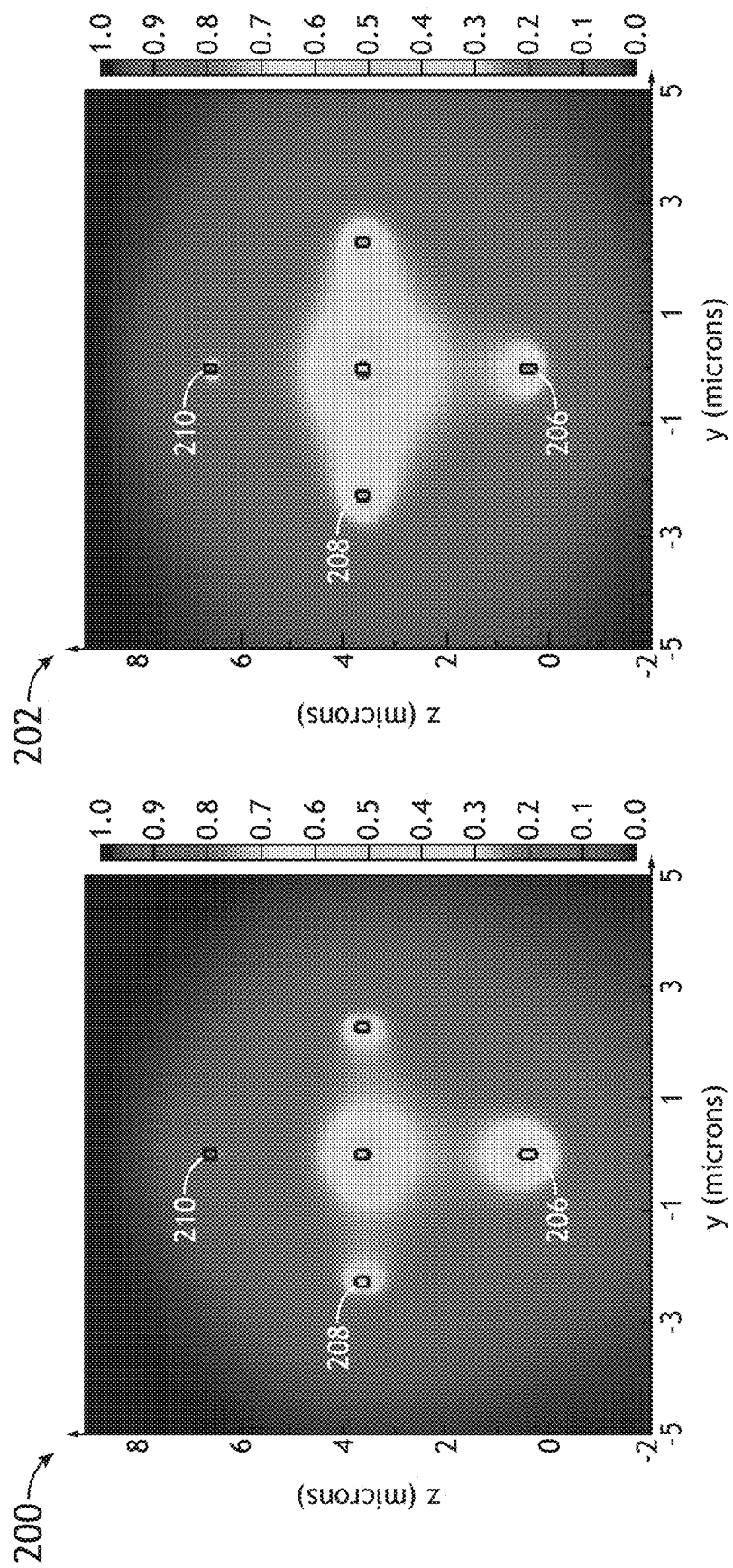

DIAMOND SPOT SIZE CONVERTER FOR FIBER EDGE COUPLING

BACKGROUND

As data rates increase there is a strong trend to move high-speed signals of a transceiver closer to the switch silicon. This is giving rise to co-packaged optics (e.g., the mounting of transceiver optics proximate to switch silicon).

Generally, Photonic Integrated Circuits (PICs) have a light input and a light output. Typically, the input on the transmitter side of the PIC is continuous wave (CW) light that is modulated and sent through the output. The input on the receiver side of the PIC is often modulated light which is then converted into electrical signals.

There are generally two main types of optical fiber-to-chip couplings utilized: (1) off-plane (vertical, out of plane, and the like) couplings; and (2) in-plane (butt) couplings. Off-plane couplings typically utilize grating couplings, while in-plane couplings are commonly edge coupled.

Edge couplings may be advantageous over other couplings because edge couplings may offer both a broadband operation as well as polarization insensitivity, which may be important to certain receiver designs.

SUMMARY

In one aspect, embodiments of the inventive concepts disclosed herein are directed to optical couplers such as, but not necessarily limited to, spot size converters with elements in a diamond shape arrangement.

For example, an optical coupler for coupling light along a propagation direction includes, in at least one embodiment, a lower area, an upper area, and an intermediary area. The lower area preferably includes a waveguide with a first end, a second end, and an inversely tapered portion. The intermediary area preferably arranged over, in a vertical direction, the lower area and including two or more intermediary elements with an upper area arranged over the intermediary area. The upper area including one or more upper elements, where the two or more intermediary elements comprise a varying pitch along the propagation direction in a first section of the optical coupler. In a preferred embodiment, the first section is arranged closer to an optical fiber side of the optical coupler than a second section and the at least one intermediary element of the two or more intermediary elements varies in a dimension along the propagation direction more than a dimension of the second section.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 2A shows a cross-sectional front view diagram of a transverse electric (TE) electric field profile of an optical coupler at a facet according to an exemplary embodiment;

FIG. 2B shows a cross-sectional front view diagram of a transverse magnetic (TM) electric field profile of the optical coupler of FIG. 2A according to an exemplary embodiment;

DETAILED DESCRIPTION

Figure 1A:
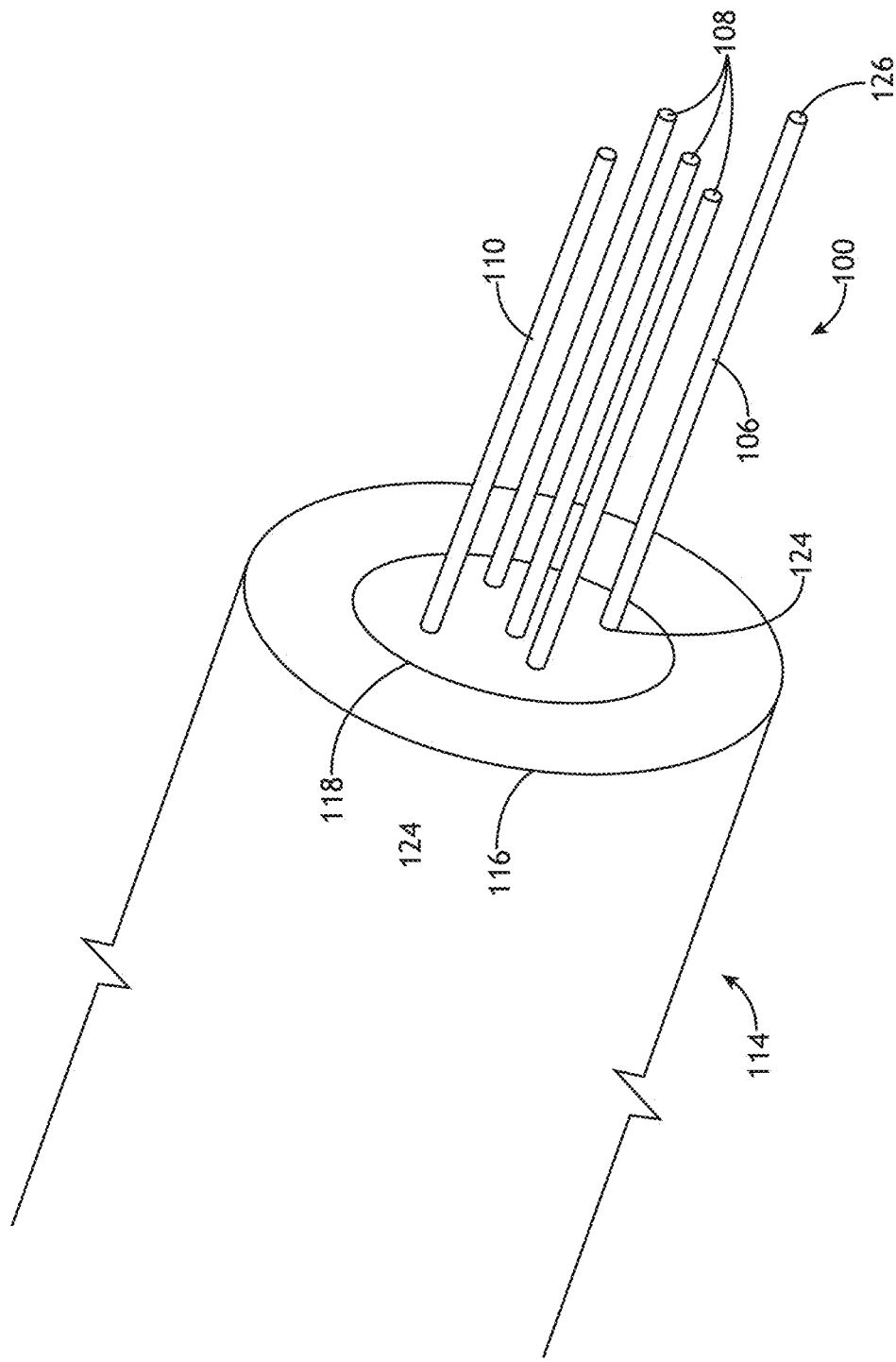
FIG. 1A shows a conceptual view of an optical coupler according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

As used herein, directional terms such as "top," "bottom," "over," "under," "upper," "upward," "lower," "down," and "downward" are intended to provide relative positions for purposes of description and are not intended to designate an absolute frame of reference. Various modifications to the described embodiments will be apparent to those with skill in the art, and the general principles defined herein may be applied to other embodiments.

Moreover, while various components may be described or depicted as being "coupled" or "connected", any two components capable of being so associated can also be viewed as being "couplable," to each other to achieve the desired functionality. Specific examples of couplable include but are not limited to physically mateable, physically fixed relative to another component, and/or physically interacting components. Other examples include being optically coupled, such as being optically aligned and configured to direct an optical signal between two components. Also, while various components may be depicted as being connected or coupled directly, direct connection or direct coupling is not a requirement. For example, components may be indirectly coupled (e.g., couplable) through some interface, device, or intermediate component whether physically (e.g., physically mated), optically, mechanically (e.g., via dynamically movable and physically interactable components), electrically, or otherwise. For example, components may be in data communication (e.g., optical signal communication) with intervening components that are not illustrated or described. It may be appreciated that "data communication" refers to both direct and indirect data communication (e.g., there may be intervening components). In one example, being coupled is permanent (e.g., two components epoxied, fused, and/or the like). In another example, being coupled is reversible (e.g., being "removably" coupled/couplable). For example, "removably" coupled/couplable may mean being capable of being coupled and uncoupled repeatedly and/or non-destructively (e.g., such as by being coupled by being temporarily held, clamped, pinned, latched, positioned, and/or the like in place).

In addition, "edge" coupled, "edge" couplable, and the like may mean being in (and/or configured to be in) an edge coupling to an edge (e.g., such as an edge of a chip and/or PIC). Generally, two types of optical fiber-to-chip optical couplings are utilized: (1) off-plane (vertical, out of plane, and the like) coupling and (2) in-plane (butt) coupling. The former typically uses grating couplings and edge couplings are used with the latter. For example, grating couplings provide for off-plane coupling of light onto PICs utilizing an optical fiber positioned above a substrate/wafer surface (e.g., a portion of a length of the optical fiber being above and parallel to the substrate surface). On the other hand, for example, the substrate may utilize narrow etched areas around the edge of a die to facilitate access to edge couplers.

Further, "alignment" may mean any alignment, such as structural and/or optical alignment. For example, components may be optically aligned such that an optical axis of a first component is orientated relative to an optical axis of a second component (e.g., to within a given tolerance such that efficiency losses of an optical signal between the optical axes of the two components are minimized). In another example, structural alignment may mean that one component is orientated (e.g., and/or configured to be orientated) relative to another component (e.g., via one or more degrees of freedom and/or to within one or more alignment tolerances of such degrees of freedom). For instance, one component may be aligned to another component to within a tolerance in regards to six degrees of freedom, such as to within a quantity of a unit of translation (e.g., 1 micron) in an X, Y, and Z direction and a quantity of a unit of rotation about the X, Y, and Z direction (e.g., X, Y, and Z may be a length, width, and/or height or the like).

Moreover, as used herein any reference to "one embodiment," "some embodiments", "at least some embodiments", and the like means that a particular element, feature, structure, or characteristic described in connection with the embodiment is included in at least one embodiment of the inventive concepts disclosed herein. The appearances of the phrase "in at least one embodiment" and the like in the specification does not necessarily refer to the same embodiment. Embodiments of the inventive concepts disclosed may include one or more of the features expressly described or inherently present herein, or any combination or sub-combination of two or more such features.

Further, "light", "optical", and the like generally means electromagnetic radiation in any range of the electromagnetic spectrum (e.g., microwave, infrared, and/or ultraviolet wavelength ranges). For example, such terms may include electromagnetic radiation from between roughly 1250 nm to 1680 nm (e.g., the O-band wavelength range).

In addition, "spot-size converter" generally means a transitional light-guiding and transforming element configured to change or convert the mode field size of a light beam to be transmitted between two waveguides carrying optical mode fields of different dimensions. For example, for a single mode optical fiber (SMF), the mode field may be considered to be an irradiance distribution (i.e., power per unit area) across the end face of the optical fiber. For example, spot-size converters may be utilized for matching a spot size of light in a silicon-based or another high-index-contrast photonic waveguide to the spot size of light in another, usually larger, optical component (e.g., optical fiber), or vice versa.

Finally, "waveguide" generally means a structure that is designed to confine and direct the propagation of light such that the electromagnetic energy of the one or more guided modes supported by the structure remains substantially confined therein. Of course, as one skilled in the art will readily understand, guided modes generally present an evanescent field that extends partially outside of the waveguide.

Broadly, some embodiments of the concepts disclosed herein are directed to optical couplings configured to couple a relatively larger spot size of an optical waveguide (e.g., optical fiber) to a relatively smaller spot size of a different component/system (e.g., PIC). In some embodiments, this disclosure relates to, but is not necessarily limited to, diamond-shaped configurations (near the facet) of optical coupler elements such as a tapered lower (core) waveguide, one or more intermediary elements (e.g., SiN liners), and one or more upper elements (e.g., SiN liners). Those, skilled in the art will also recognize that an optical element may include, e.g., a space or void, a lens, a prism, a diffuser, a mask, and/or a phaseplate or the like.

PICs are increasingly popular. For optical communication purposes, silicon chips performing photonic processing couple light in and out of optical fibers. For example, one type of optical fiber is SMF-28, operational at the 1310 nm and 1550 nm spectral light wavelength. SMF-28 may have a mode-field diameter (MFD) of about 9.2±0.4 µm at 1310 nm and 10.4±0.8 µm at 1550 nm. Such a MFD corresponds to a spot size of roughly the same size, such as about 10 um. However, silicon devices typically are much smaller in size, such as being on the order of roughly 0.5 µm in height. Therefore, if only a simple butt-coupling was used, a large portion of the light from the optical fiber would be lost. It is contemplated that reducing the spot size in an efficient and highly manufacturable way would be advantageous.

Some methods to reduce the spot size of an optical fiber-to-chip coupling utilize inverse nanotaper designs. Some inverse nanotaper designs in a Si and SiN platform may convert the optical fiber field mode to a smaller field mode (e.g., with a smaller corresponding spot size) but may require either high numerical aperture (NA) optical fibers or an external spot size converter (e.g., an intermediary system that is not manufactured on the same substrate as the PIC). These methods may be relatively expensive and/or require strict misalignment tolerances.

Still other methods use suspended coupler designs compatible with single mode optical fiber (SMF) but such methods may cause a larger risk to reliability of the coupling.

Some embodiments of the present disclosure address at least some of these challenges. For example, at least one embodiment of the present disclosure allows for a relatively large field mode compatible edge coupling utilizing elements (e.g., silicon nitride elements) compatible with CMOS fabrication processes that has relatively higher reliability, higher misalignment tolerances, ease of manufacturability, lower losses (i.e., more efficiency), and/or more compactness (e.g., shorter taper length) compared to one or more other methods.

Referring to FIG. 1A, a conceptual view of an optical coupler 100 is shown, in accordance with one or more embodiments of the present disclosure. Note that FIG. 1A is meant to be a conceptual, nonlimiting view and the shape of the components shown (e.g., elements 108, 110) may be any shape such as rectangular in cross section (rather than circular as shown) and disposed in one or more cladding layers (not shown).

In at least some embodiments, the optical coupler 100 is configured to couple light along a propagation direction. For example, the optical coupler 100 may be capable of coupling light between a second waveguide 114 (e.g., optical fiber) and third waveguide (not shown; e.g., a silicon waveguide of a PIC). For example, in at least some embodiments, the optical coupler 100 is configured to convert to and/or from a mode field diameter (MFD) of a single-mode optical fiber (SMF). In some examples, the optical coupler 100 is configured to convert to and/or from a MFD of more than 8 microns and less than 11 microns. The second waveguide 114 may include a fiber core 118 and a fiber cladding 116. In some embodiments, a diameter of the fiber core 118 is roughly 9 microns (e.g., somewhere between 8 to 11 microns). Note that the size of the fiber core 118 may not be to scale (proportional) to a diameter of the fiber cladding 116 for a SMF that, in at least some embodiments, the second waveguide is a SMF (e.g., CORNING® SMF-28™).

In at least some embodiments, the optical coupler 100 includes a waveguide 106, two or more intermediary elements 108, and one or more upper elements 110. In some examples, the waveguide 106 may be referred to as a "core waveguide."

In at least some embodiments, other elements (e.g., elements 108, 110) and the waveguide 106 of the optical coupler 100 are arranged in a diamond shape as shown. For example, see FIG. 10 for an illustration of a conceptual outline of a diamond shape 1018 surrounding such elements. Such a diamond shape configuration may allow for, in some embodiments, expansion of the mode-field diameter (MFD) of the optical coupler 100 in an efficient, compact, and/or highly manufacturable manner while allowing for relatively high misalignment tolerances.

In at least some embodiments, the waveguide 106 has a first end 124 and a second end 126 opposite the first end. Further, the waveguide 106 may include an inversely tapered portion (not shown) disposed between the first end 124 and the second end 126.

Figure 1B:
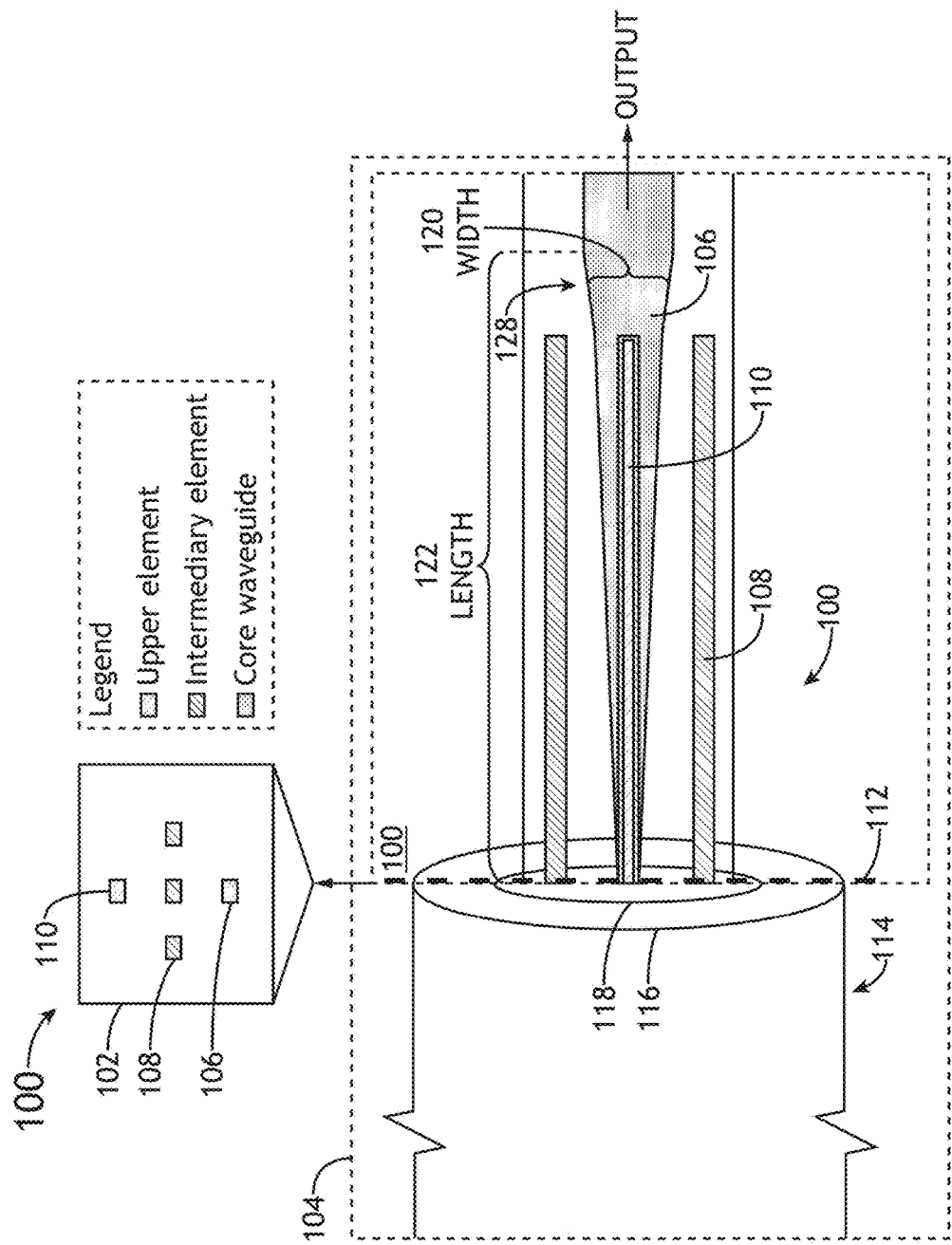
FIG. 1B shows a top view of an optical coupler and a cross-sectional front view of the optical coupler near a facet according to an exemplary embodiment.

Referring to FIG. 1B, a top view 104 of an optical coupler 100 and a cross-sectional front view 102 of the optical coupler 100 near a facet 112 is shown, in accordance with one or more embodiments of the present disclosure. The facet 112 may generally mean the interface between the optical coupler 100 and a second waveguide 114 (e.g., such that a narrower portion of the waveguide 106 is closer to the facet 112 than the wider portion of the waveguide 106).

In at least some embodiments, the waveguide 106 may include an inversely tapered portion 128. For example, the inversely tapered portion 128 may generally mean a portion of the waveguide 106 that is tapered, such as the portion being measured by taper length 122 and taper width 120 in FIG. 1B. For example, inversely tapered may mean a varying taper width 120 that is smaller (e.g., smaller in the lateral direction) near the facet 112 and is larger farther from the facet 112 as is shown in FIG. 1B. It should also be recognized that a taper may vary in dimension in one or more planes in one or more portions. In at least some embodiments, a linear expansion (i.e., inverse taper) of the waveguide 106 may be used to adiabatically couple a relatively larger field mode at the facet 112 to a single mode silicon waveguide near an opposing side (i.e., near the "OUTPUT") of the optical coupler 100. While the inversely tapered portion 128 is shown as two linear taper portions, the figures and descriptions are nonlimiting and the inversely tapered portion 128 may include any tapering. For example, the inversely tapered portion 128 may be a nonlinear (e.g., curved) taper, one or more tapered portions intermixed between one or more non-tapered portions, and/or otherwise and may (or may not) form an adiabatic taper. Similarly, elements (e.g., elements 108, 110) may likewise include one or more portions of varying width that are linear and/or nonlinear, and intermixed and/or non-intermixed with non-varying width portions, or otherwise.

Note that a propagation direction may be parallel to the "OUTPUT" (output) direction shown in FIG. 1B, parallel to an optical axis of the second waveguide 114, and/or the like and may be the direction along which light propagates. In this regard, the propagation direction may, in a sense, be a received direction from the perspective of the third waveguide (e.g., PIC (not shown)). A direction opposite to the propagation direction may be a transmitted direction from the perspective of the PIC and a received direction from a perspective of the second waveguide 114. For purposes of the present disclosure, "along a propagation direction" and the like may mean towards and/or away from such a propagation direction. For instance, the optical coupler 100 may be used to couple light in two opposing directions—both to and from the second waveguide 114, and to and from the third waveguide.

Note that a vertical direction is an upwards and/or downwards direction in front view (e.g., view 102 of FIG. 1B) and side views, but is normal to (e.g., through the page) for top views (e.g., FIG. 1B). For example, for purposes of this disclosure, the vertical direction may be defined such that the upper element 110 in view 102 of FIG. 1B is considered vertically above the waveguide 106.

Note that a lateral direction may be a direction orthogonal to the vertical direction and the propagation direction. For example, the direction along which intermediary elements are arranged in a row in view 102 of FIG. 1B may be the lateral direction.

Figure 1C:
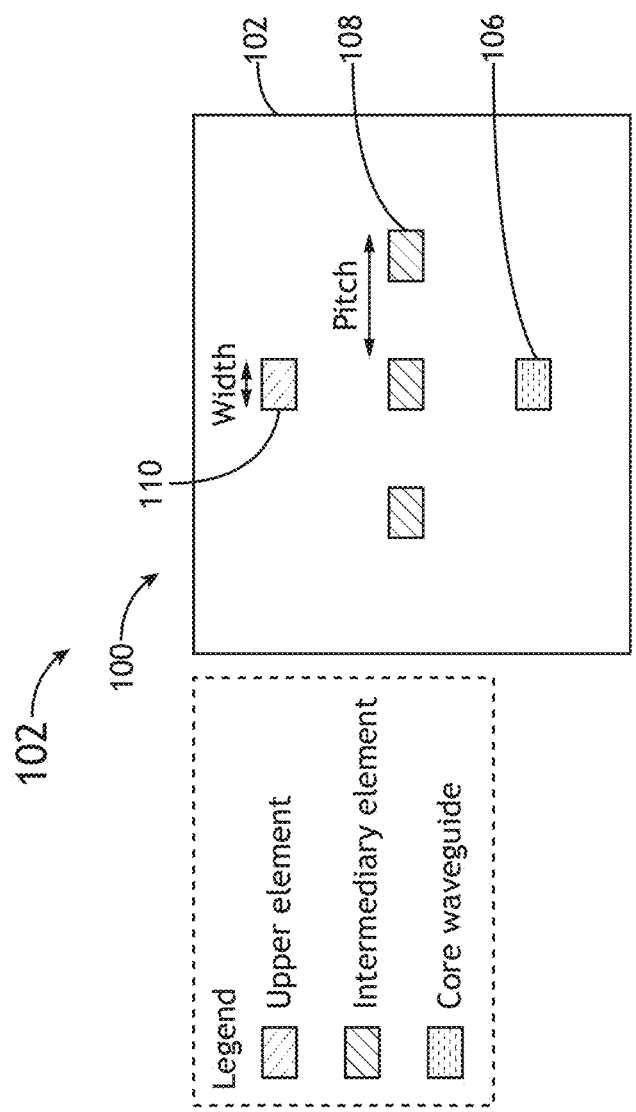
FIG. 1C shows the cross-sectional front view of FIG. 1B according to an exemplary embodiment.

Referring to FIG. 1C, the cross-sectional front view 102 of optical coupler 100 of FIG. 1B at the facet 112 is shown, in accordance with one or more embodiments of the present disclosure.

In at least some embodiments, the configuration (e.g., size, layout, pitch, and the like) of the optical coupler 100 is such that the mode field diameter at the facet is ~9 microns (e.g., more than 8 microns and less than 11 microns). For example, in at least some embodiments, the pitch between each intermediary element 108 is 2.28 microns and/or similar (e.g., between 2 to 2.5 microns, 2 microns, 2.25 microns, 2.5 microns, and/or the like). In at least some embodiments, a lateral width of the upper element 110 and/or intermediary element 108 is 0.150 microns and/or similar (e.g., between 0.1 to 0.2 microns, and/or the like). Such dimensions may provide for, in at least some embodiments, a MFD of ~9 microns at the facet 112.

In at least some embodiments, each intermediary element 108 is arranged in a row along the lateral direction. For some examples, a pitch (i.e., spacing) between each intermediary element 108 may be equal (repetitive) and/or the rows may be symmetrical relative to a center of the waveguide 106 as shown.

Referring to FIG. 2A, a cross-sectional front view diagram 200 of a transverse electric (TE) electric field profile of an optical coupler 100 at a facet 112 is shown, in accordance with one or more embodiments of the present disclosure.

Referring to FIG. 2B, a cross-sectional front view diagram 202 of a transverse magnetic (TM) electric field profile of the optical coupler 100 of FIG. 2A at the facet 112 is shown, in accordance with one or more embodiments of the present disclosure.

For example, FIGS. 2A and 2B may be the TE and TM electric field profiles, respectively, of the optical coupler 100 of FIG. 1B at the facet 112. As shown, a waveguide area 206 may correspond to the waveguide 106, intermediary element areas 208 may correspond to the intermediary elements 108, and upper element area 210 may correspond to the upper element 110.

Figure 3:
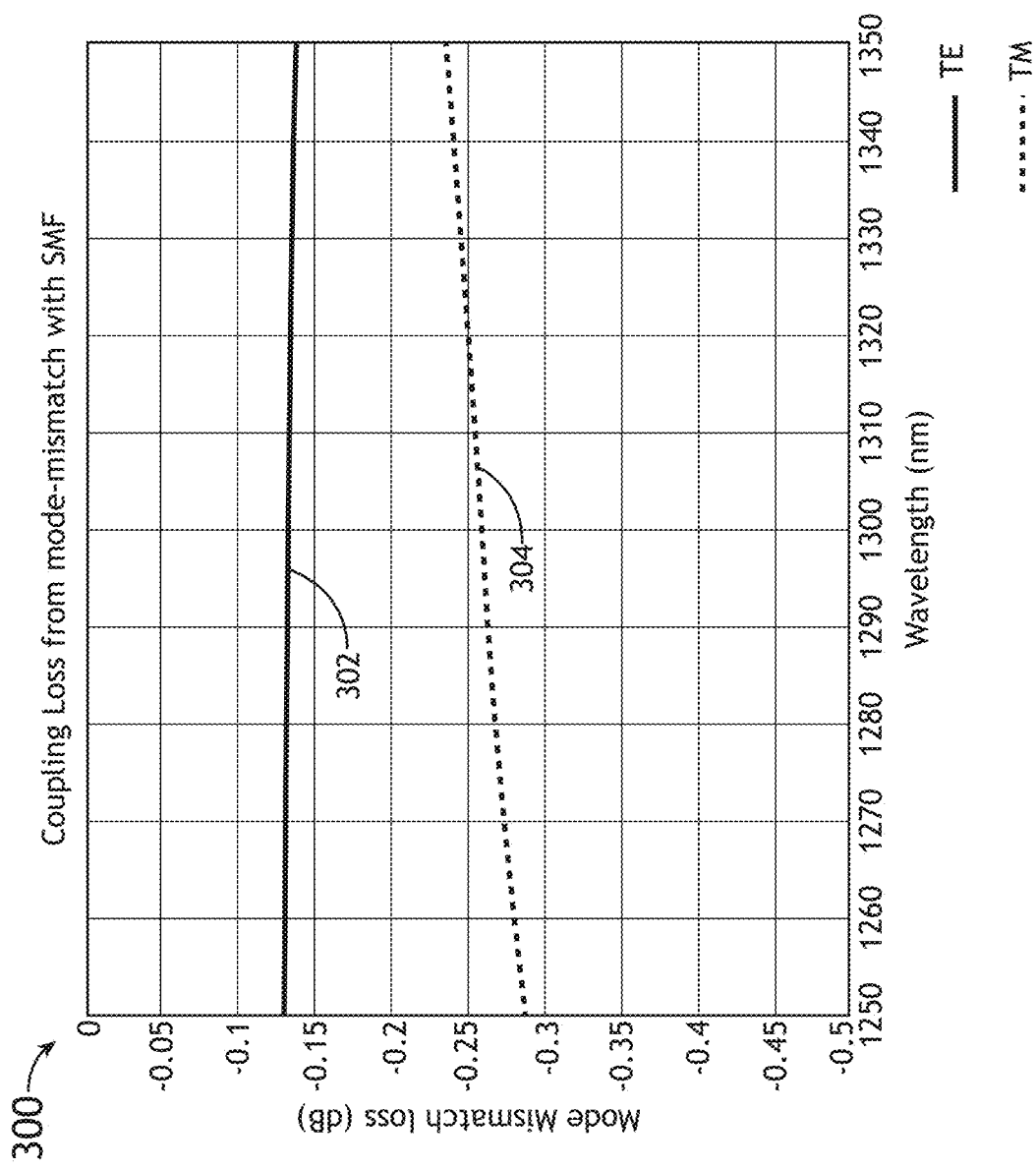
FIG. 3 shows a graphical representation of coupling loss from mode mismatch for a single mode optical fiber (SMF) versus wavelength according to an exemplary embodiment.

Referring to FIG. 3, a graphical representation 300 of coupling loss from mode mismatch for a single mode optical fiber (SMF) versus wavelength is shown, in accordance with one or more embodiments of the present disclosure. As shown, for at least some embodiments, a coupling loss associated with TM 304 and a coupling loss associated with TE 302 may both be less than 0.5 dB. Further, a polarization mode dispersion loss (PDL) may be less than 0.1 dB at the O-band (i.e., wavelength between 1260 nm and 1360 nm).

Figure 4A:
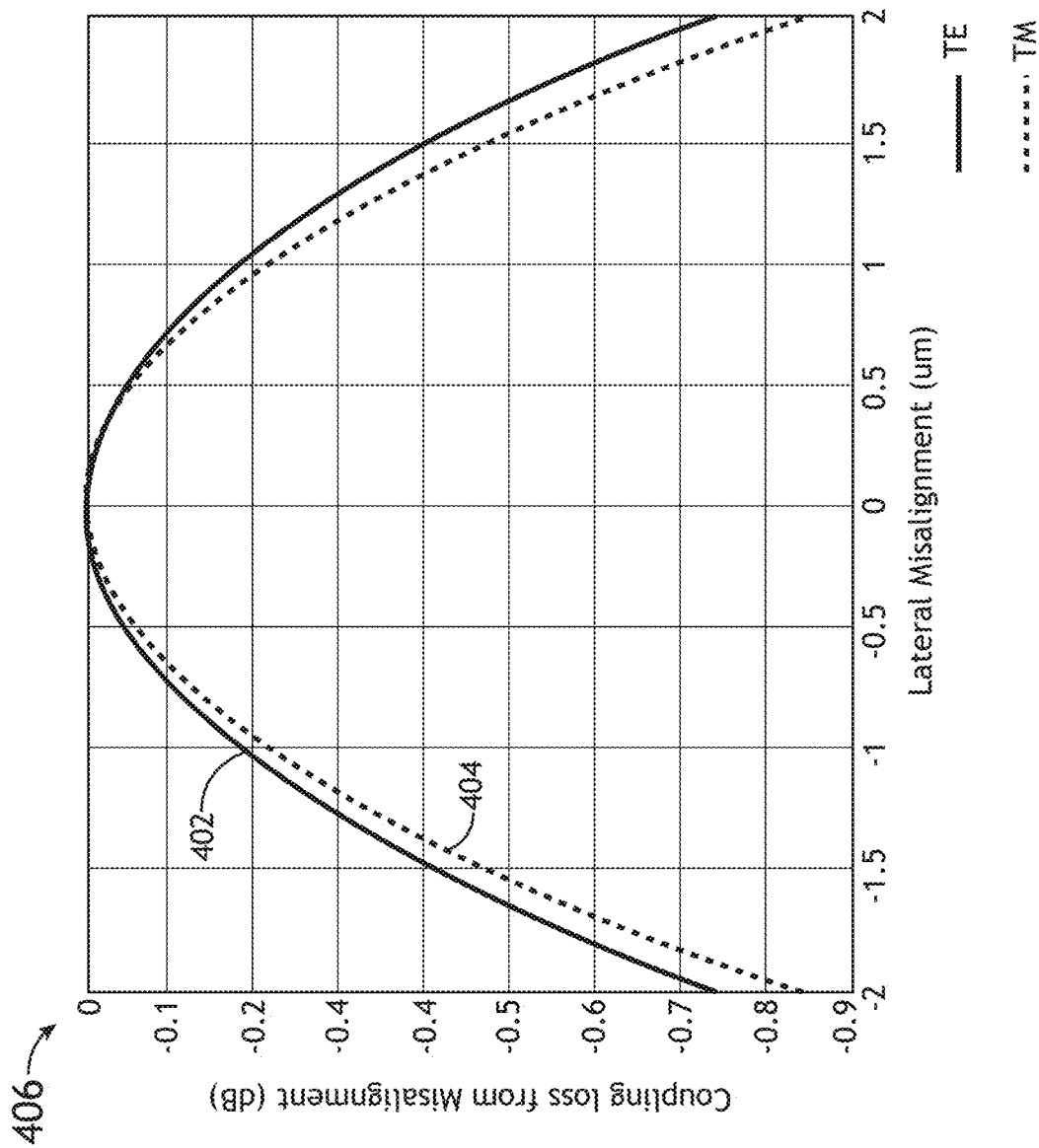
FIG. 4A shows a graphical representation of coupling loss from lateral misalignment versus lateral misalignment according to an exemplary embodiment.

Referring to FIG. 4A, a graphical representation 406 of coupling loss versus lateral misalignment is shown, in accordance with one or more embodiments of the present disclosure.

Figure 4B:
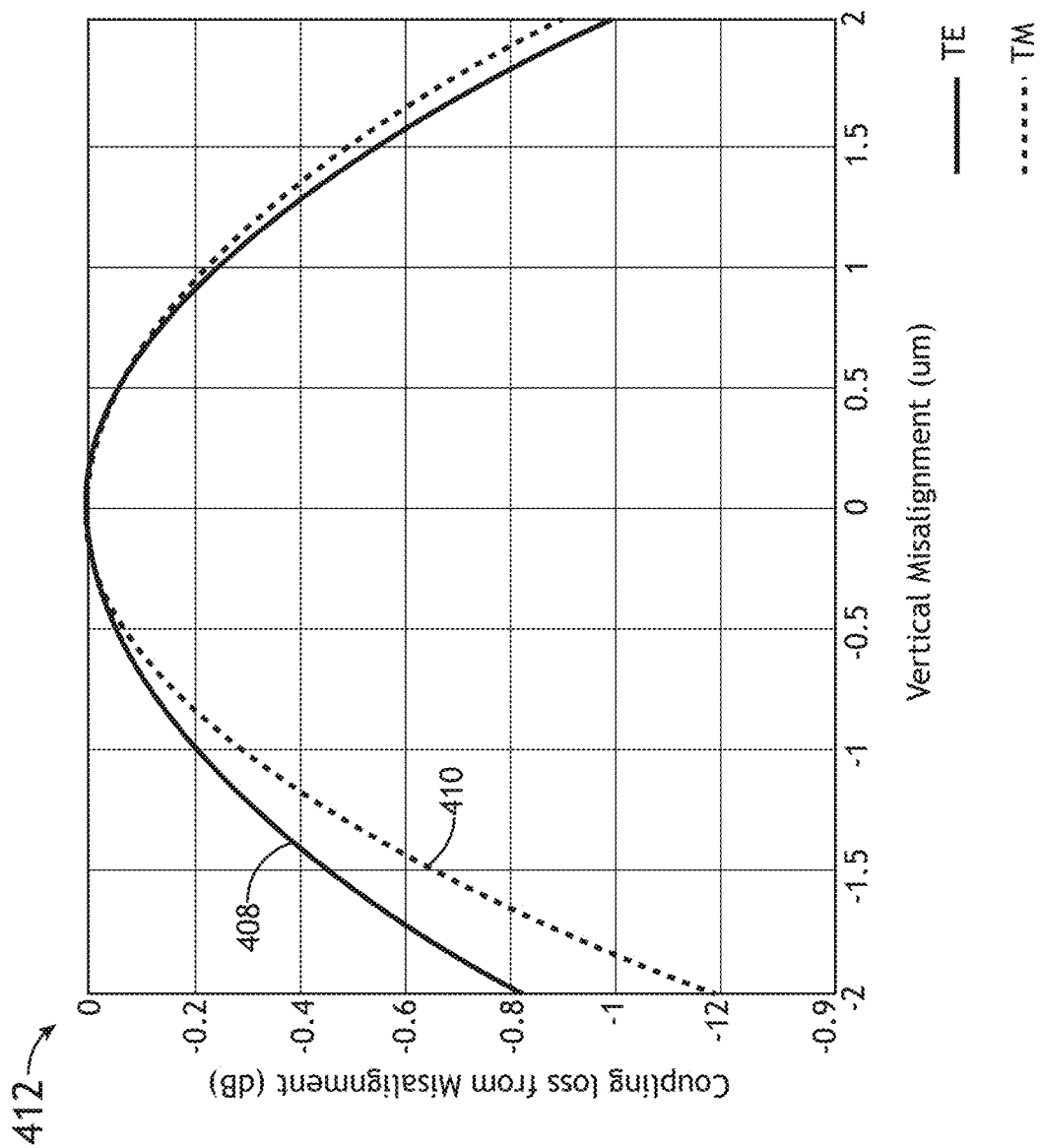
FIG. 4B shows a graphical representation of coupling loss from vertical misalignment versus vertical misalignment according to an exemplary embodiment.

Referring to FIG. 4B, a graphical representation 412 of coupling loss versus vertical misalignment is shown, in accordance with one or more embodiments of the present disclosure.

As shown in FIGS. 4A and 4B, for at least the first micron of misalignment in a positive or negative direction (laterally and vertically), the coupling loss remains less than 0.4 dB per micron of misalignment. For some examples, as shown in FIG. 4A, a coupling loss associated with TM 404 may generally be more than a coupling loss associated with TE 402 for lateral misalignment. Further, as shown in FIG. 4B, a coupling loss associated with TM 410 may vary compared to a coupling loss associated with TE 408 for vertical misalignment.

Figure 5:
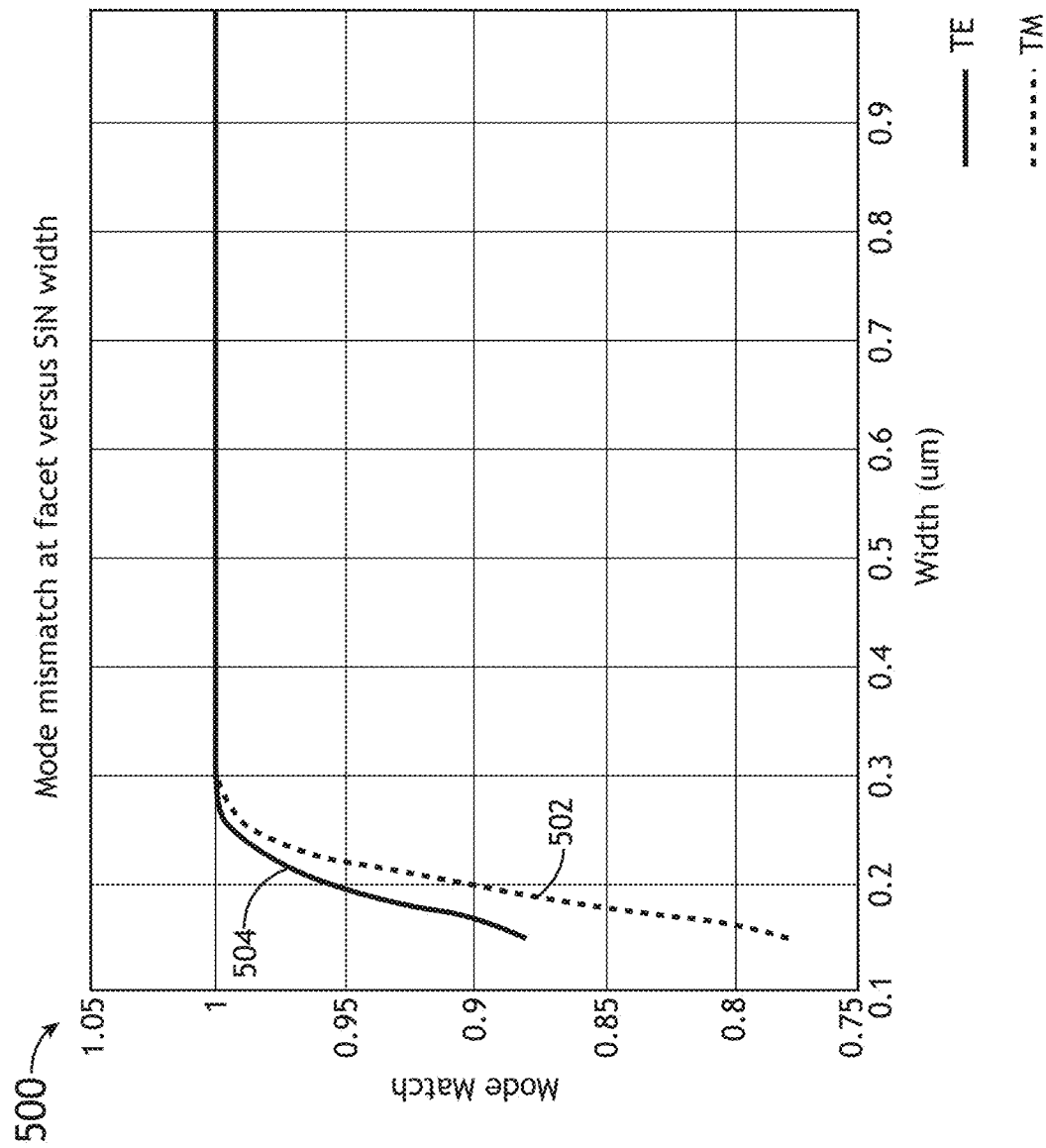
FIG. 5 shows a graphical representation of mode match versus taper width at a facet of an optical coupler according to an exemplary embodiment.

Referring to FIG. 5, a graphical representation 500 of mode match for TM versus taper width 120 at a facet of an optical coupler 100 is shown, in accordance with one or more embodiments of the present disclosure. For example, for this graphical representation 500, taper width 120 may mean the starting/initial width 120 of the waveguide 106 at (or near) the facet 112. As shown, in some embodiments, the mode match (i.e., lack of mismatch) for TE 504 may be higher than the mode match for TM 502 at the facet 112.

Figure 6A:
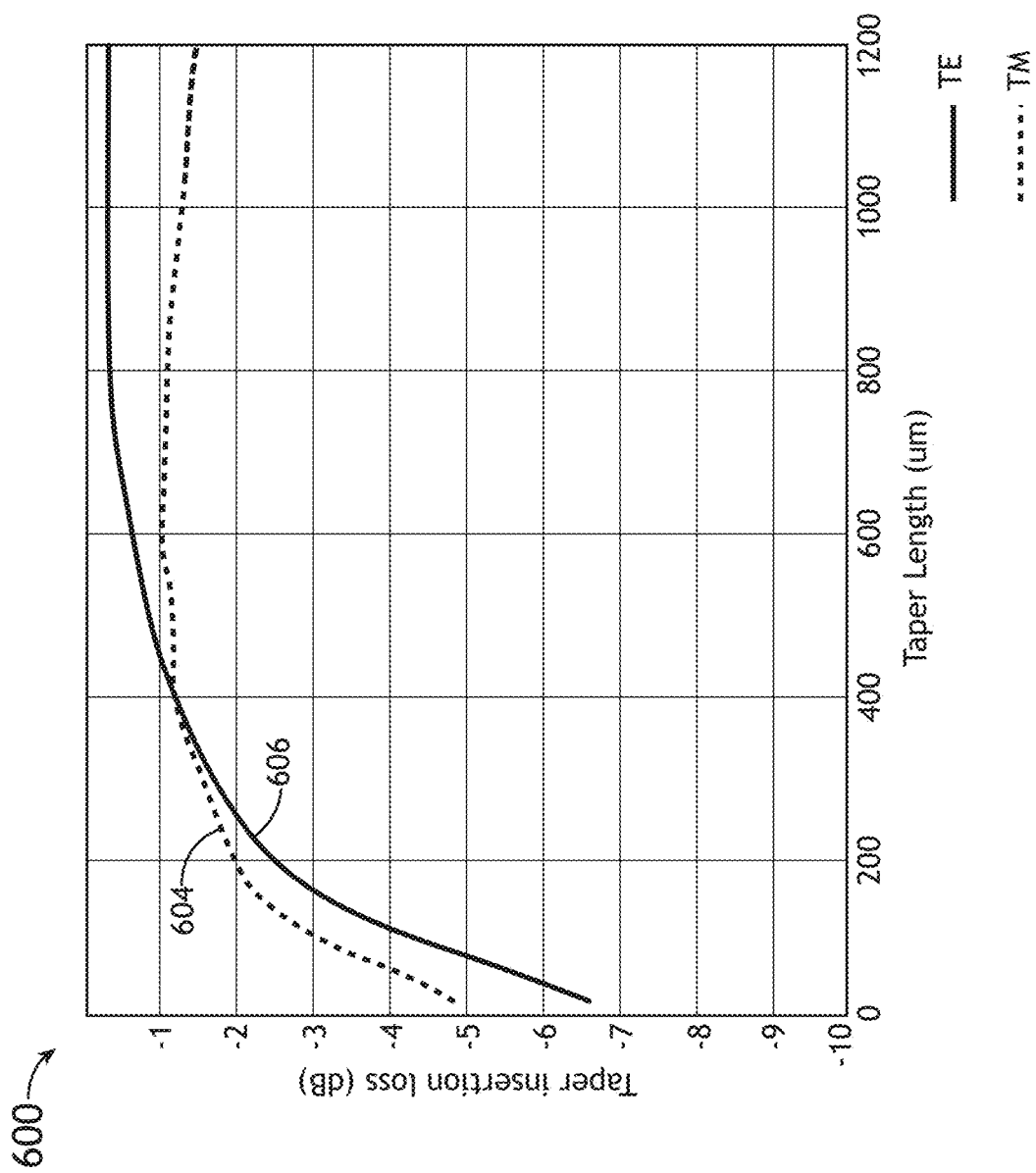
FIG. 6A shows a graphical representation of taper insertion loss versus taper length according to an exemplary embodiment.

Referring to FIG. 6A, a graphical representation 600 of taper insertion loss versus taper length 122 is shown, in accordance with one or more embodiments of the present disclosure. As shown, in some embodiments, the taper insertion loss for TM 604 may vary compared to the taper insertion loss for TE 606 at the facet 112 when varying taper length 122.

In at least some embodiments, the taper width 120 at the facet 112 and the taper length 122 are selected so as to optimize (e.g., minimize) losses and/or mode mismatch (i.e., lack of mode match) at the facet 112. Such a concept may be better understood in reference to FIGS. 5 and 6A. For example, in reference to FIG. 5, the taper width 120 at the facet may be selected so as to minimize mode mismatch by maximizing mode match. For instance, the taper width 120 may be selected to be 0.3 microns or the like. In another example, in reference to FIG. 6A, the taper length 122 may be selected so as to minimize taper insertion loss. For instance, the taper width 120 may be selected to be between 600 to 800 microns or the like.

Figure 6B:
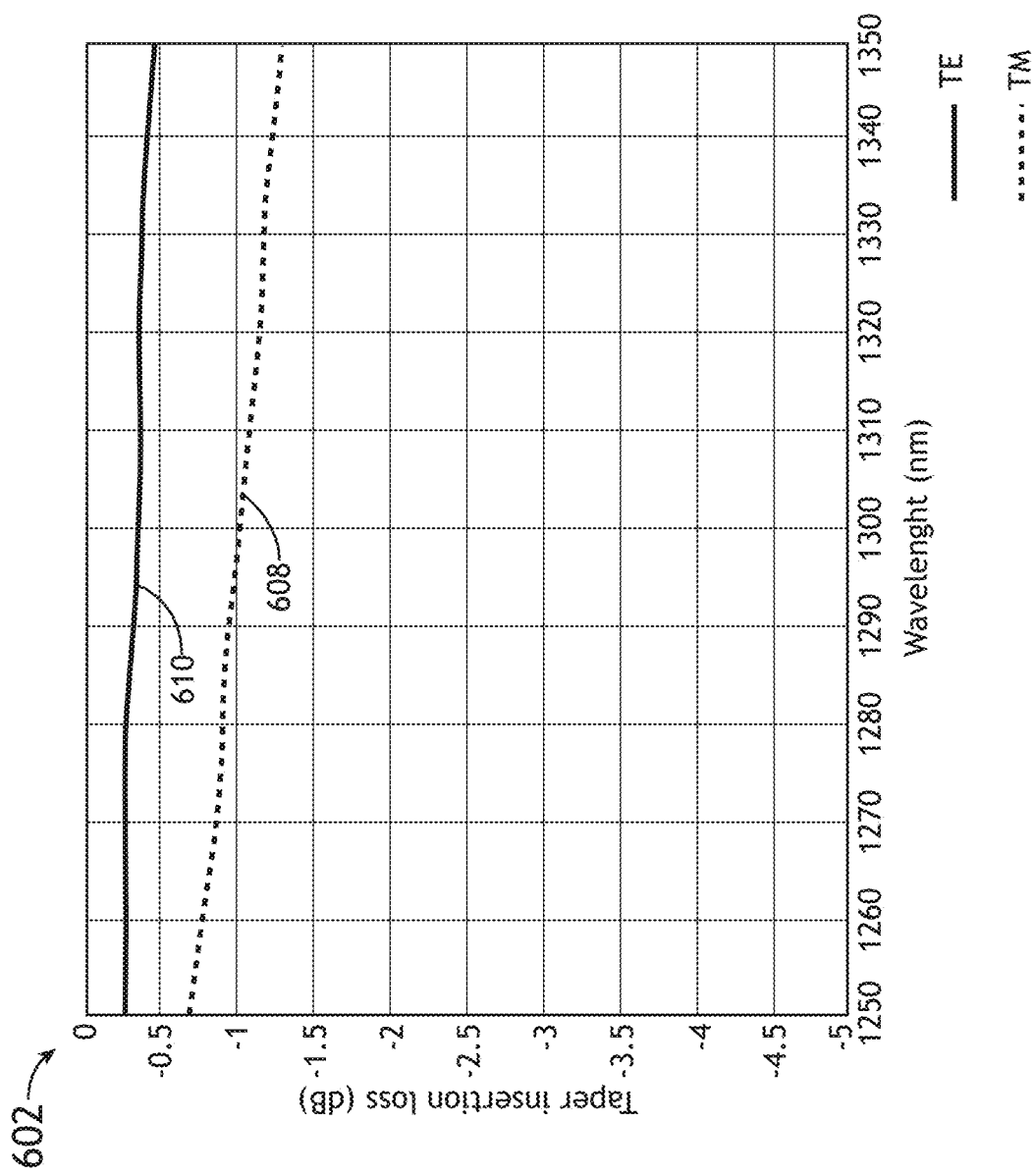
FIG. 6B shows a graphical representation of taper insertion loss versus wavelength according to an exemplary embodiment.

Referring to FIG. 6B, a graphical representation 602 of taper insertion loss versus wavelength is shown for a waveguide 106 having an optimized taper length 122, in accordance with one or more embodiments of the present disclosure. For example, taper insertion loss of TM 608 may be lower than taper insertion loss of TE 610 as shown for waveguides 106 with optimized taper lengths 122.

Figure 7:
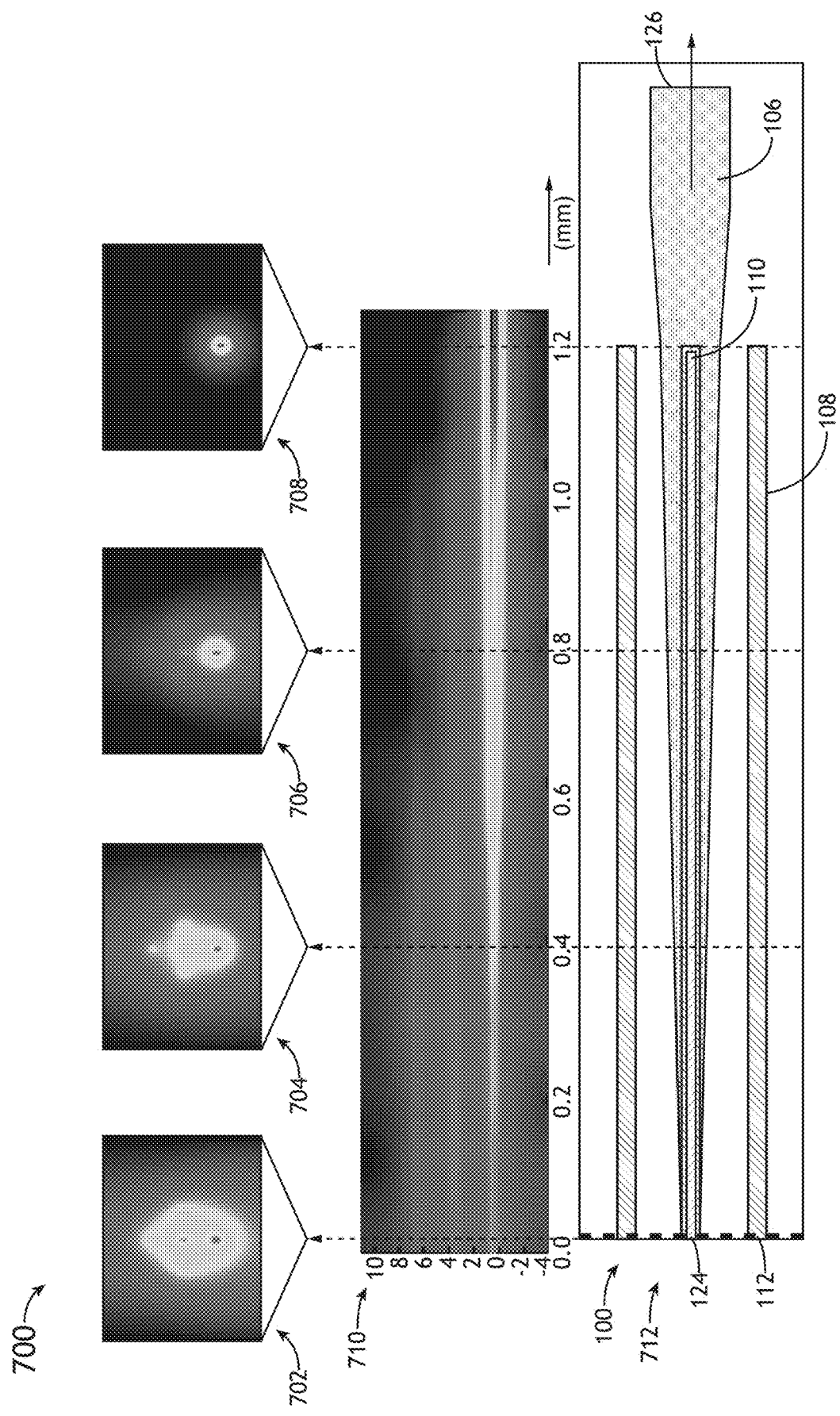
FIG. 7 shows a top view of an optical coupler, a side view of an electric field profile of the optical coupler, and cross-sectional front views of electric field profiles of the optical coupler along a propagation direction according to an exemplary embodiment.

Referring to FIG. 7, various views 700 related to an optical coupler 100 are shown. A top view 712 of an optical coupler 100, a side view 710 of an electric field profile of the optical coupler 100, and cross-sectional front views 702, 704, 706, 708 of electric field profiles of the optical coupler 100 along a propagation direction are shown, in accordance with one or more embodiments of the present disclosure. As shown in cross-sectional front views 702, 704, 706, 708, the mode field diameter (MFD) (and corresponding spot size) is desirably reduced from the first end 124 towards the second end 126 along the propagation direction. For example, in some embodiments, the mode field is distributed between the elements 108, 110 and the waveguide 106 near the first end 124 as shown by views 702 and 704. Further, in some examples, the mode field may be confined (or nearly confined) inside the waveguide 106 at or near the second end 126 of the waveguide 106 as shown.

Figure 8:
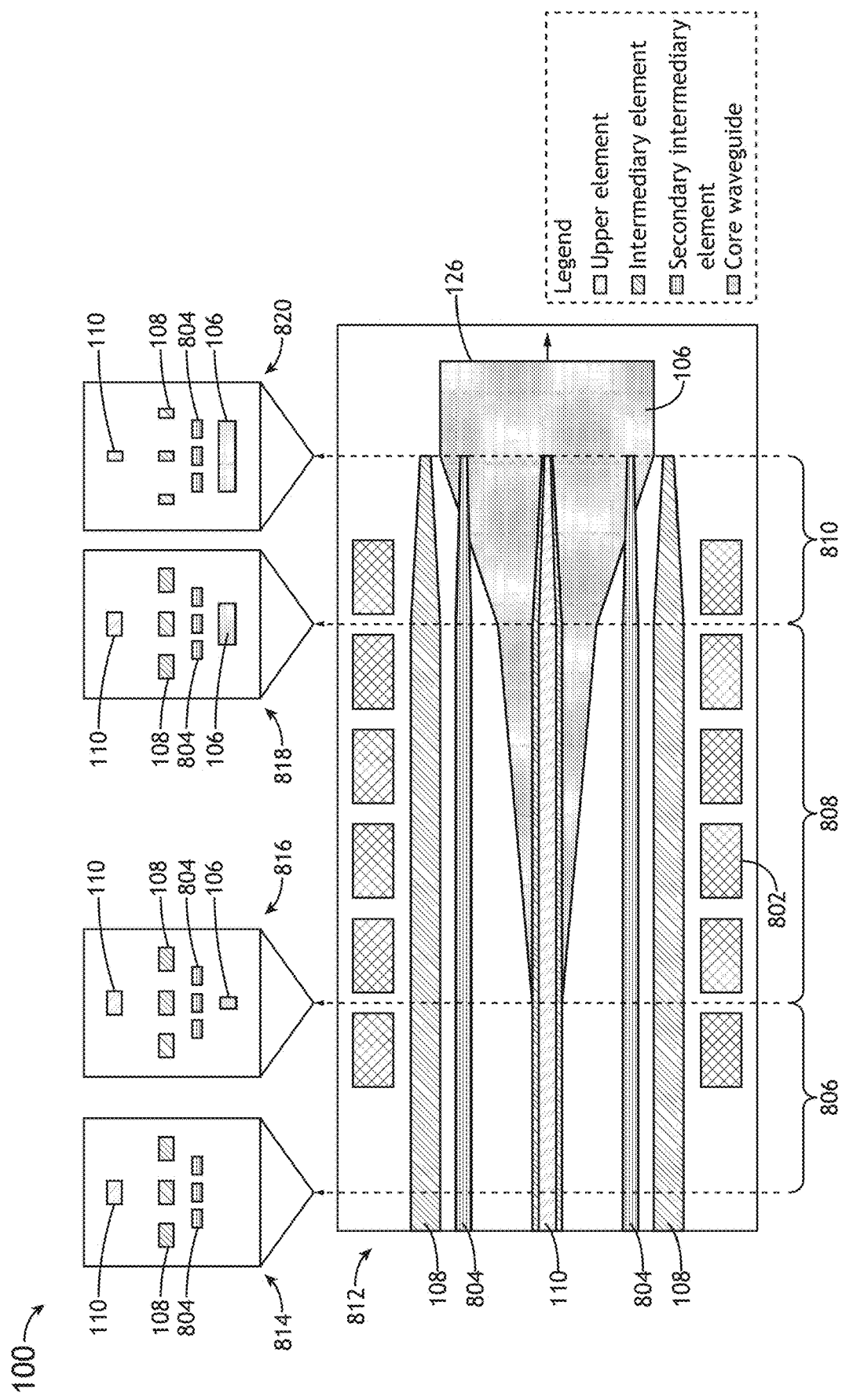
FIG. 8 shows a top view of an optical coupler with undercuts, and cross-sectional front views of the optical coupler along a propagation direction according to an exemplary embodiment.

Referring to FIG. 8, a top view 812 of an optical coupler 100 with undercuts 802, and cross-sectional front views 814, 816, 818, 820 of the optical coupler 100 along a propagation direction are shown, in accordance with one or more embodiments of the present disclosure.

In at least some embodiments, the optical coupler 100 may include an insulating layer (not shown) below the lower area 1012. For example, the insulating layer may be a buried oxide (BOX) layer.

In at least some embodiments, the optical coupler 100 may include a substrate layer (not shown) below the below the insulating layer.

It should be noted that while undercuts 802 may be shown as on the sides of the waveguide 106 for simplicity, the undercuts 802 may, in at least some embodiments, alternatively and/or in addition, be under the waveguide 106. For example, each undercut 802 in the row of undercuts 802 at the bottom of FIG. 8 may be the same undercut as the undercuts in the row higher up in FIG. 8 such that there are six undercuts shown in FIG. 6 spaced along the direction of propagation. Note that utilizing multiple, spaced-apart undercuts 802 along the propagation direction may allow for maintaining structural support to components of the optical coupler 100 by allowing supporting areas (i.e., the areas between the undercuts 802) of a substrate layer that were not cut away to continue to support the components (e.g., waveguide 106).

In at least some embodiments, undercuts 802 are defined by the material of the layers that surrounds them. For example, undercuts 802 may be voids (e.g., air spaces) not filled with material. For instance, the undercuts 802 may be isotopically etched into a substrate layer under the waveguide 106. For example, the undercuts 802 may be located directly under the waveguide 106 such that the waveguide 106 forms a bridge between undercuts 802. In other examples, the undercuts 802 may be located below the waveguide 106 but with an intervening insulating layer between the undercuts 8-2 and the waveguide 106. In some examples, the undercuts 802 are at least partially defined by the layer above them which may be a lower cladding layer of a lower area (e.g., lower area 1012 of FIG. 10), an insulating layer (not shown; e.g., buried oxide insulating layer between the lower cladding layer and the substrate), or the like. In some examples, the undercuts 802 are at least partially defined by any layer surrounding them, such as encapsulating material on the lateral sides of the undercuts, a lower cladding layer, an insulating layer, or the like.

In at least some embodiments, undercuts 802 are not air-filled and are instead at least partially or fully filled with material. For example, undercuts may include a material with a refractive index that matches a refractive index of an insulating layer, a cladding layer, and/or the waveguide 106.

In at least some embodiments, the optical coupler 100 is formed from consecutively deposited layers (e.g., in a complementary metal-oxide-semiconductor (CMOS) fabrication process). For example, at least some of the components shown herein as being a part of the optical coupler 100 may be capable of, in at least some embodiments, being fabricated in a CMOS process.

In at least some embodiments, the inversely tapered portion 128 includes a first inversely tapered portion 808 and a second inversely tapered portion 810. For example, the first inversely tapered portion 808 may taper more gradually than the second inversely tapered portion 810. Further, the first inversely tapered portion 808 may be shorter in length than the second inversely tapered portion 810. Finally, the first inversely tapered portion 808 may be located closer to the first end 124 and/or facet 112 than the second inversely tapered portion 810.

In at least some embodiments, the optical coupler 100 includes an initial section 806 before the first end 124 (not shown in FIG. 8) of the waveguide 106. For example, the two or more intermediary elements 108 and the one or more upper elements 110 may extend past the first end 124 of the waveguide 106 along the propagation direction and the waveguide 106 may not necessarily occupy such an initial section 806. For example, as shown in view 814, the waveguide is not located at that location of the initial section of FIG. 8.

In at least some embodiments, the second end 126 of the waveguide 106 may extend past the two or more intermediary elements 108 and the one or more upper elements 110 along the propagation direction.

Figure 10:
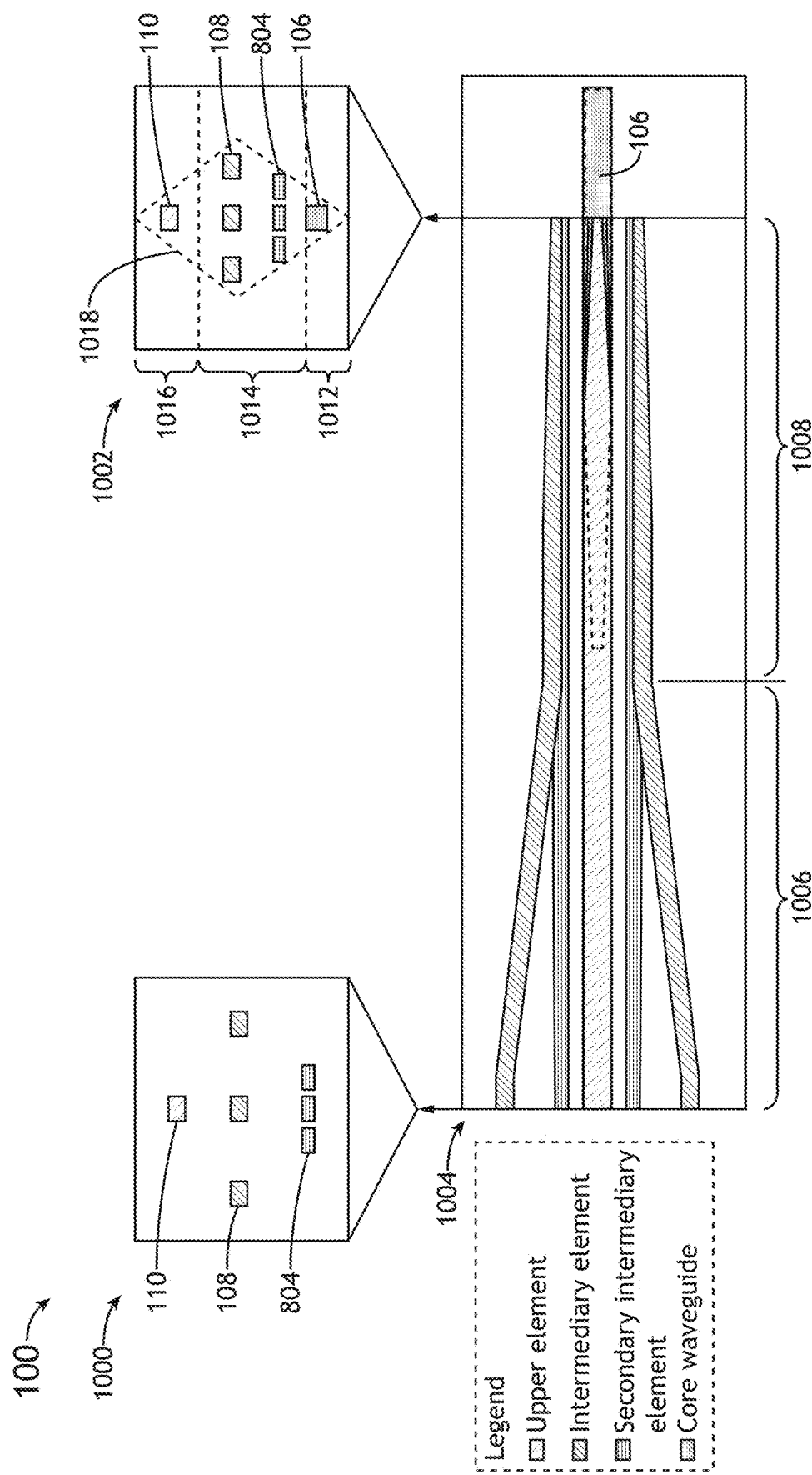
FIG. 10 shows a top view of an optical coupler with elements having varying pitch, and cross-sectional front views of the optical coupler along a propagation direction according to an exemplary embodiment.

In at some embodiments, the optical coupler 100 includes two or more secondary intermediary elements 804. For example, the two or more secondary intermediary elements 804 may be in an intermediary area 1014 above the waveguide 106 as shown in FIG. 10. In some examples, the two or more secondary intermediary elements 804 are below the two or more intermediary elements 108.

In at some embodiments, as shown, the two or more secondary intermediary elements 804 are less tall, measured in the vertical direction, than the two or more intermediary elements 108. Such a configuration may allow for an optical coupler 100 design having lower sensitivity to an insulating layer (e.g., buried oxide layer) refractive index as well as facilitating shorter taper lengths 122 for a given amount of allowable coupling loss.

It should be noted that FIG. 8 is not meant to be limiting and, in some embodiments, any number of elements may be arranged in any number of configurations. For example, optical coupler 100 may include multiple rows (e.g., 5 rows, 10 rows, 100 rows, and the like) of any number (e.g., 2, 3, 5, 10, 100 and the like) of intermediary elements in each row having any cross-section shape (e.g., rectangular-shaped elements, circular-shaped elements, I-beam-shaped elements, or any other shape).

Figure 9A:
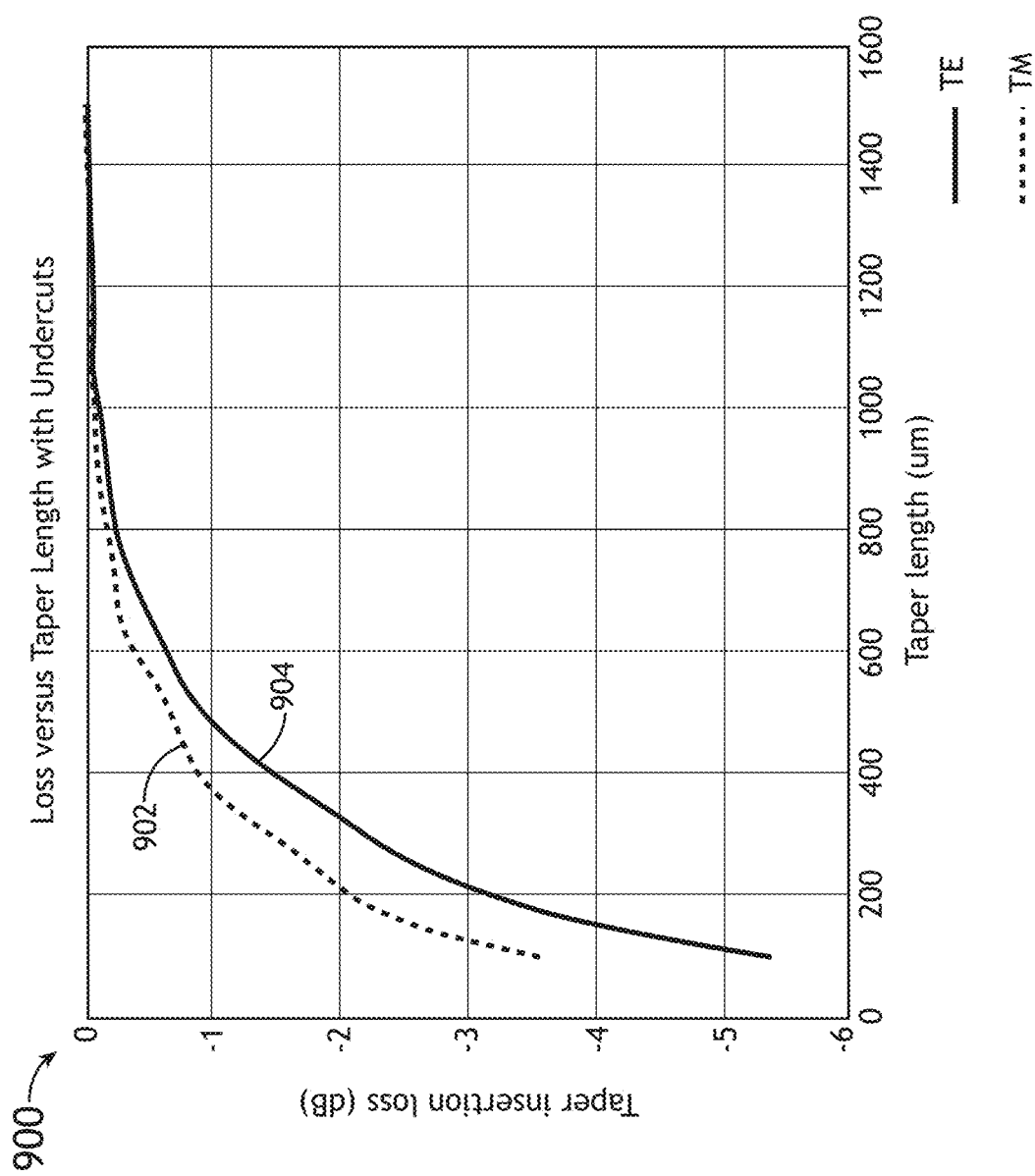
FIG. 9A shows a graphical representation of taper insertion loss versus taper length for an optical coupler with undercuts according to an exemplary embodiment.

In at least some embodiments, undercuts 802 provide for reduced leakage to a substrate layer below the waveguide 106. For example, a substrate layer (not shown) may be directly below or below with intervening layers above the substrate layer. For instance, as compared to FIG. 6A, FIG. 9A shows reduced taper insertion losses for at least some taper length 122 ranges. For example, coupling loss and/or taper insertion loss may be reduced by 0.5 dB or more for TE and by 1 dB or more for TM by utilization of one or more undercuts 802.

Referring to FIG. 9A, a graphical representation 900 of taper insertion loss versus taper length for an optical coupler 100 with undercuts 802 is shown, in accordance with one or more embodiments of the present disclosure. Taper insertion loss for TM 902 and taper insertion loss for TE 904 are shown.

Figure 9B:
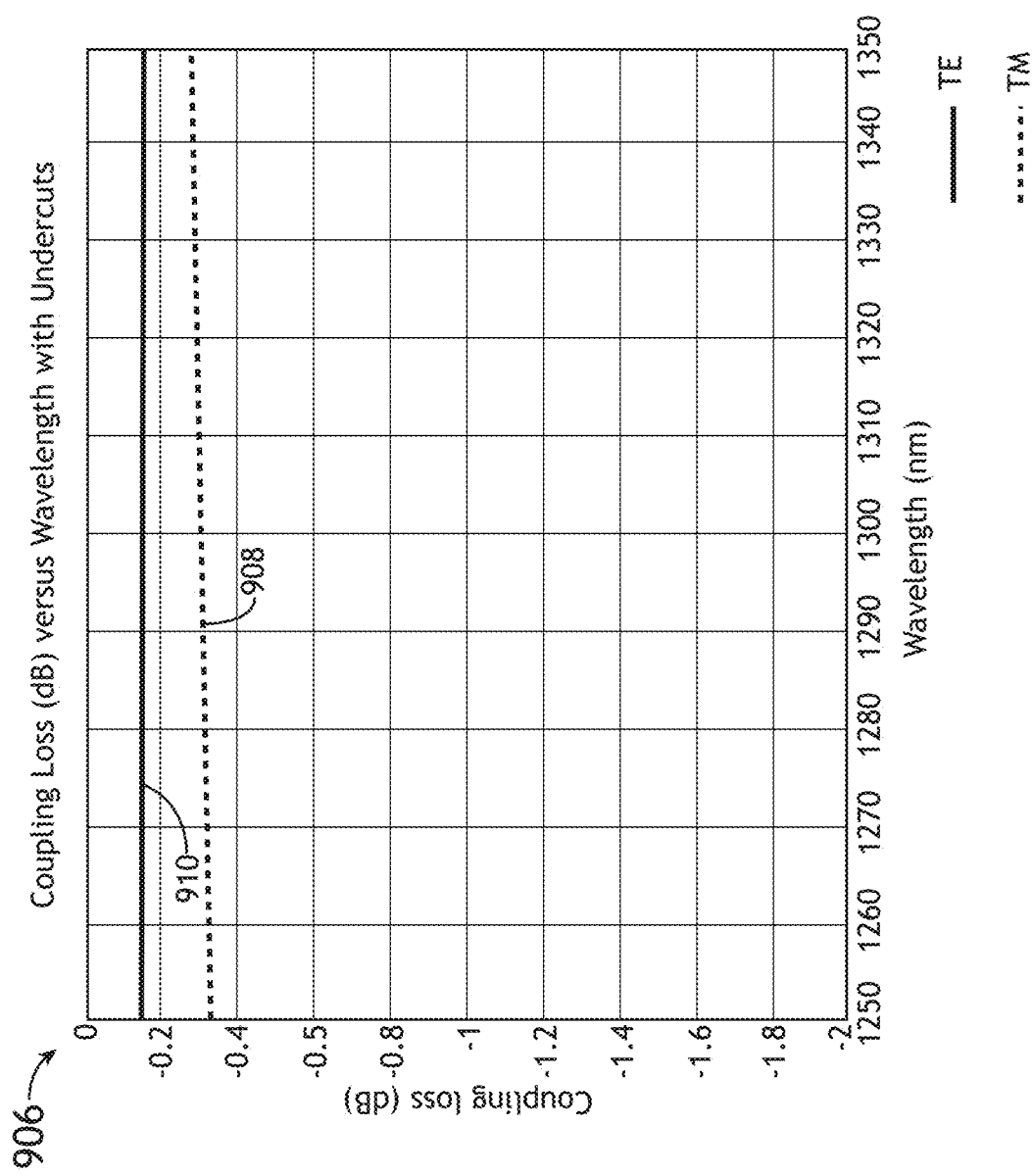
FIG. 9B shows a graphical representation of coupling loss versus wavelength for an optical coupler with undercuts according to an exemplary embodiment.

Referring to FIG. 9B, a graphical representation 906 of coupling loss versus wavelength for an optical coupler 100 with undercuts 802 is shown, in accordance with one or more embodiments of the present disclosure. Coupling loss for TM 908 and coupling loss for TE 910 are shown.

Referring to FIG. 10, a top view 1004 of an optical coupler 100 with elements having varying pitch, and cross-sectional front views 1000, 1002 of the optical coupler 100 along a propagation direction are shown, in accordance with one or more embodiments of the present disclosure.

In at least some embodiments, a varying pitch of elements (e.g., elements 108, elements 110, and/or elements 804) allows for modifying an effective mode index (e.g., refractive index of the optical coupler 100 at any given layer at any point along the propagation direction) and an effective mode size of the optical coupler 100 along the propagation direction. For example, effective mode index may be the combined refractive index of the optical coupler 100 taking into account aspects such as the size, position, and refractive index of each component of the optical coupler 100 such that changing such aspects of the optical coupler 100 changes the effective mode index. Similarly, the effective mode size may be the combined field mode of the optical coupler 100 and may depend upon, for example, the same or similar aspects such as the size, position, and refractive index of each component of the optical coupler 100.

For example, as shown, two or more intermediary elements 108 may include a varying pitch along the propagation direction in a first section 1006 of the optical coupler 100 and non-varying pitch in a second section 1008. Such a varying pitch in the first section 1006 and non-varying pitch in the second section 1008 may be referred to as a hybrid mode. Such a hybrid mode may create a relatively larger effective mode index in the second section 1008, which may help to further reduce the required taper length 122 for a given allowable coupling loss and reduce leakage into a substrate layer.

In some embodiments, for a hybrid mode, the first section 1006 may be closer to the facet (not shown) (e.g., closer to an optical fiber side) than the second section 1008. For instance, the pitch of elements 108 may be larger near a facet 112 in the first section 1006 and gradually reduce towards the second section 1008. In some examples, all else being equal, such a varying reduction in pitch may allow for a reduction in the MFD along the propagation direction. For example, such a varying pitch may allow for a smaller footprint of an optical coupler 100 for a given amount of allowable coupling loss. Such a varying pitch may allow a center of the mode field to stay at the same height in a vertical direction as a configuration without such a varying pitch, which may help reduce leakage of the mode field into a substrate. In some embodiments, the pitch of other elements (e.g., the two or more secondary intermediary elements 804) is kept constant throughout both sections 1006, 1008 to increase design flexibility.

In at least some embodiments, a varying width of elements (e.g., elements 108 and/or elements 110) allows for modifying an effective mode index and effective mode size of the optical coupler 100 along the propagation direction. For example, as shown in FIG. 10, at least one intermediary element 108 of the two or more intermediary elements 108 may include a varying width along the propagation direction in the second section 1008 of the optical coupler 100. For instance, the width may reduce/narrow towards the second end 126.

In at least some embodiments, optical coupler 100 is in a diamond shape 1018 configuration (e.g., arrangement, pattern, and the like). For example, elements 108, 110 and waveguide 106 may be in such a diamond shape 1018 configuration at the facet 112 and/or at any other location along the propagation direction.

For example, wider spaced elements towards the middle (e.g., in the intermediary layer 1014) of the waveguide 106 may be arranged wider (e.g., as measured from the outermost edges of the outermost elements in the lateral direction) than different elements that are above (e.g., in the upper area 1016) those wider spaced elements such that a diamond shape 1018 is formed. For instance, at least a portion (e.g., the outermost portions/edges) of the two or more intermediary elements 108 may be located outside, in a lateral direction, the one or more upper elements 110 and the waveguide 106. In this regard, the two or more intermediary elements 108 may form a wider center of a diamond shape 1018.

In at least some embodiments, optical coupler 100 includes one or more areas. For example, optical coupler 100 may include a lower area 1012, an intermediary area 1014 arranged over, in a vertical direction, the lower area 1012, and an upper area 1016 arranged over the intermediary area 1014. Note that areas may comprise any number of layers per area (e.g., layers of a deposition and/or etching process).

In at least some embodiments, optical coupler 100 includes one or more cladding layers. Note that each cladding layer may itself be multiple layers (e.g., multiple layers of a deposition and/or etching process) or may be a single layer. For example, each cladding layer of the one or more cladding layers may itself comprise one or more layers. The cladding layers may include material that encapsulates elements 108, 120, 804, and waveguide 106 as shown in view 1002. For example, the lower area 1012 may include a lower cladding layer of one or more cladding layers, the intermediary area 1014 may include an intermediary cladding layer of the one or more cladding layers, and the upper area 1016 may include an upper cladding layer of the one or more cladding layers. In at least some embodiments, one or more cladding layer refractive indexes of the one or more cladding layers are lower than one or more element refractive indexes of the, for example, two or more intermediary elements 108 and the one or more upper elements 110. In this regard, the refractive index of the areas may be increased by adding elements with refractive indexes that are higher than the refractive index of the cladding layers of those areas. For example, the elements 108, 110, the waveguide 106 and the like may be comprised of silicon nitride material and the cladding layers may be comprised of material with a lower refractive index such as, but not limited to, silicon dioxide ($SiO_2$) material.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

We claim:

1. An optical coupler configured to couple light along a propagation direction comprising:
 a lower area comprising:
  a waveguide comprising a first end, a second end, and an inversely tapered portion; and
  undercuts coupled to the waveguide via an intervening insulating layer, the undercuts being spaced apart along the propagation direction, and at least one of the undercuts comprising a material characterized by a first refractive index and comprising a fill material;
 an intermediary area arranged over, in a vertical direction, the lower area and comprising:
 two or more intermediary elements; and
 an upper area arranged over the intermediary area and comprising:
  one or more upper elements;
  wherein:
   at a facet, the waveguide, the two or more intermediary elements, and the one or more upper elements are arranged in a diamond shape, with the two or more intermediary elements laterally wider than both the one or more upper elements and the waveguide;
   the undercuts are positioned below the waveguide with the intervening insulating layer between the undercuts and the waveguide, the undercuts being separated by portions that support the waveguide, and the waveguide forms a bridge between the undercuts.

2. The optical coupler of claim 1, wherein at least a portion of the two or more intermediary elements are located outside, in a lateral direction, the one or more upper elements and the waveguide.

3. The optical coupler of claim 1, wherein the intermediary area further comprises two or more secondary intermediary elements arranged below the two or more intermediary elements and arranged over the waveguide.

4. The optical coupler of claim 3, wherein the two or more secondary intermediary elements have at least one dimension that varies.

5. The optical coupler of claim 3, wherein the two or more intermediary elements and the one or more upper elements extend past the first end of the waveguide along the propagation direction and the second end of the waveguide extends past the two or more intermediary elements and the one or more upper elements along the propagation direction.

6. The optical coupler of claim 3, wherein the two or more intermediary elements comprise a varying pitch along the propagation direction in a first section of the optical coupler.

7. The optical coupler of claim 6, wherein the first section is closer to an optical fiber side of the optical coupler than a second section of the optical coupler.

8. The optical coupler of claim 7, wherein at least one intermediary element of the two or more intermediary elements comprises a varying width along the propagation direction in the second section of the optical coupler.

9. The optical coupler of claim 1, wherein the waveguide, the two or more intermediary elements, and the one or more upper elements comprise silicon nitride material.

10. The optical coupler of claim 1, wherein the lower area further comprises a lower cladding layer of one or more cladding layers, wherein the intermediary area further comprises an intermediary cladding layer of the one or more cladding layers, wherein the upper area further comprises an upper cladding layer of the one or more cladding layers.

11. The optical coupler of claim 10, wherein one or more cladding layer refractive indexes of the one or more cladding layers are lower than one or more element refractive indexes of the two or more intermediary elements and the one or more upper elements.

12. The optical coupler of claim 10, wherein the one or more cladding layers comprise silicon dioxide (SiO2) material.

13. The optical coupler of claim 1, wherein the first refractive index matches a refractive index of the intervening insulating layer or the waveguide.

14. An optical coupler configured to couple light along a propagation direction comprising:
 a lower area comprising:
  a waveguide comprising a first end, a second end, and a first and second inversely tapered portion, wherein the first inversely tapered portion at least one of (a) tapers more gradually than the second inversely tapered portion; (b) has at least one dimension varying from the second inversely tapered portion; or (c) is nearer at least one of the first end or facet than the second inversely tapered portion; and
  undercuts coupled to the waveguide via an intervening insulating layer, the undercuts being spaced apart along the propagation direction, and at least one of the undercuts comprising a material characterized by a first refractive index and comprising a fill material;
 an intermediary area arranged over, in a vertical direction, the lower area and comprising:
  two or more intermediary elements; and
 an upper area arranged over the intermediary area and comprising:
  one or more upper elements;
  wherein:
   at a facet, the waveguide, the two or more intermediary elements, and the one or more upper elements are arranged in a diamond shape, with the two or more intermediary elements laterally wider than both the one or more upper elements and the waveguide;
   the undercuts are positioned below the waveguide with the intervening insulating layer between the undercuts and the waveguide, the undercuts being separated by portions that support the waveguide, and the waveguide forms a bridge between the undercuts.

15. The optical coupler of claim 14, wherein the optical coupler is configured to convert to and from a mode-field diameter (MFD) of a single-mode optical fiber (SMF).

16. The optical coupler of claim 14, wherein the optical coupler is configured to convert to and from a mode-field diameter (MFD), wherein the MFD is more than 8 microns and less than 11 microns.

17. The optical coupler of claim 14, wherein the optical coupler further comprises an insulating layer below the lower area.

18. The optical coupler of claim 17, wherein the insulating layer is a buried oxide (BOX) layer.

19. The optical coupler of claim 17, wherein the optical coupler further comprises a substrate layer below the insulating layer.

20. An optical coupler configured to couple light along a propagation direction comprising:
 a lower area comprising:

a waveguide comprising a first end, a second end, and an inversely tapered portion; and
undercuts coupled to the waveguide via an intervening insulating layer, the undercuts being spaced apart along the propagation direction, and at least one of the undercuts comprising a material characterized by a first refractive index and comprising a fill material;
an intermediary area arranged over, in a vertical direction, the lower area and comprising:
two or more intermediary elements; and
an upper area arranged over the intermediary area and comprising:
one or more upper elements,
wherein the two or more intermediary elements comprise a varying pitch along the propagation direction in a first section of the optical coupler,
wherein the first section is closer to an optical fiber side of the optical coupler than a second section,
wherein at least one intermediary element of the two or more intermediary elements comprises a varying width along the propagation direction in a second section of the optical coupler;
wherein:
at a facet, the waveguide, the two or more intermediary elements, and the one or more upper elements are arranged in a diamond shape, with the two or more intermediary elements laterally wider than both the one or more upper elements and the waveguide;
the undercuts are positioned below the waveguide with the intervening insulating layer between the undercuts and the waveguide, the undercuts being separated by portions that support the waveguide, and the waveguide forms a bridge between the undercuts.

* * * * *